Figure 1:
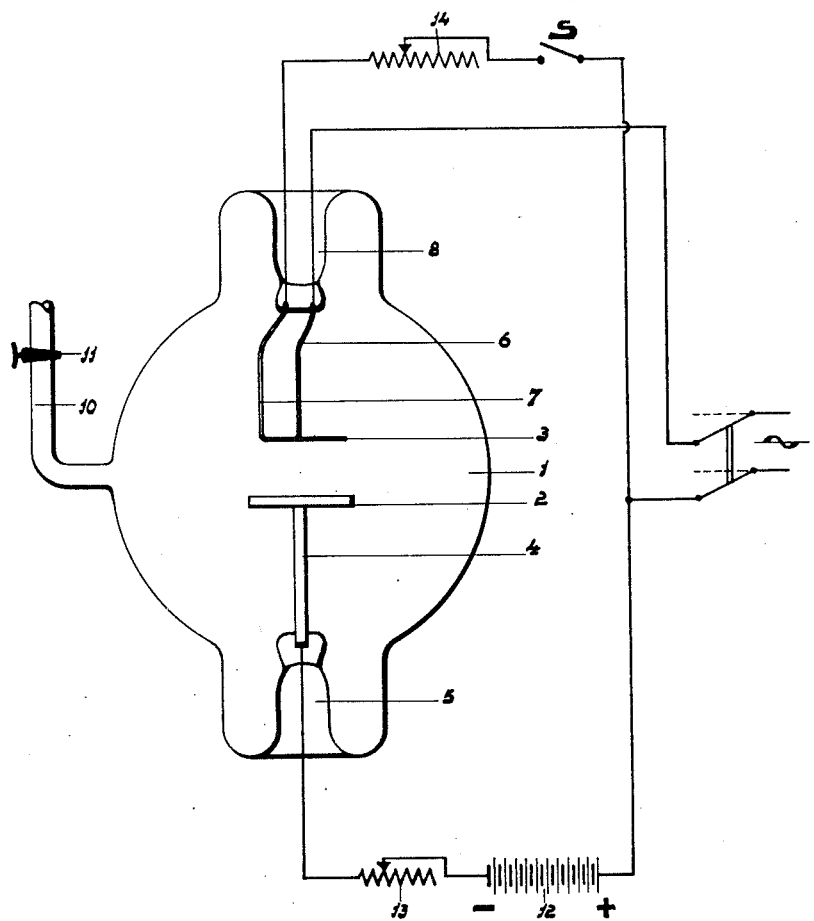

Nov. 12, 1929.  G. L. HERTZ  1,735,080

ELECTRON EMITTING CATHODE

Filed Dec. 31, 1923

Inventor.

Gustav Ludwig Hertz.
By E. T. & J. F. Brandenburg
Attorneys.

UNITED STATES PATENT OFFICE

GUSTAV LUDWIG HERTZ, OF EINDHOVEN, NETHERLANDS, ASSIGNOR TO NAAMLOOZE VENNOOTSCHAP PHILIPS' GLOEILAMPEN FABRIEKEN, OF EINDHOVEN, NETHERLANDS

ELECTRON-EMITTING CATHODE

Application filed December 31, 1923, Serial No. 683,729, and in the Netherlands January 12, 1923.

This invention relates to the manufacture of electrodes for discharge tubes and more particularly to that type of electron-emitting electrodes which is generally called "oxide-cathode" and which is used for example in transmission or receiving valves for wireless telegraphy, telephony and similar purposes, X ray tubes and rectifiers.

The electrodes of the said type hitherto known comprise a body of, for example, platinum coated with certain metal-oxides, showing a very high emission of electrons as the temperature is raised. For the active layer alkaline earth metals are preferably used.

In the manufacture and practical use of the said electrodes which were described for the first time by Wehnelt, various difficulties have been encountered. As for example the dropping off of the layer of oxide, the non-constant working of the electrode due to uneven heating of the layer, and the disappearance of the oxide were detrimental whilst also the high ohmic resistance of the active layer should be mentioned as an objectionable property.

In the process according to the present invention an oxide cathode is not formed by applying a more or less thick layer of the active oxides to a metal core but by incorporating the active material in the starting material of the electrode. The process according to the present invention is simpler than those in use until now and obviates entirely various of the aforesaid inconveniences.

In the process according to the present invention a thin layer of one or more alkaline earth metals is applied to a body consisting at least at its surface of a metal or a metal alloy capable of alloying with the alkaline earth metals. After that the body is heated in such a manner in a non-oxidizing atmosphere, thus in a vacuum or in a neutral or reducing atmosphere, that the alkaline earth-metal forms an alloy with the material of the body, whereupon the body is submitted to an oxidizing treatment. The alkaline earth metals are calcium, strontium, and barium.

In some cases it may be desirable according to another feature of the present invention to previously render the body porous at its surface.

In the present specification and claims "alloying" will be understood to be also the absorption of a metal in a liquid state by another metal. The first metal is thus finely divided between the particles of the latter metal. If for example a metal body is porous it is capable of absorbing certain other metals in a liquid state.

Metals or metal alloys capable of alloying with the alkaline earth metals are for example platinum, palladium, nickel, copper, and their alloys. These materials are also in other respects quite suitable for the purpose of the present invention, as they can easily be applied in any desired shape and they do not melt or weaken at the temperature they acquire during the working of the tube (for example 700°–1000° C.) Obviously, as a rule, the body serving as an electrode will be constructed entirely of the said metals but if desired it is also possible to apply the said metals to a core of another metal.

A thin layer of one or more alkaline earth metals is applied to the surface of the body, for example after the same has been shaped in the form it must have as an electrode. This may be done by distilling or by applying a certain quantity of alkaline earth metal to the surface and fusing the said quantity whereupon it spreads over the surface.

According to the present invention compounds which are decomposed when heated thereby producing an alkaline earth metal may also be used. Thus for example it is possible to use barium azoimide ($BaN_6$) which decomposes when heated into barium and nitrogen so that when a layer of barium azoimide is applied to the electrode a thin layer of metallic barium remains on the electrode after heating.

It is also possible to use for example azoimides of other alkaline earth metals or a mixture of the same.

After that it is necessary to heat the electrode in order to alloy the alkaline earth metal with the surface of the cathode. For this purpose it suffices to heat to a temperature slightly beyond the melting point of the alkaline earth metal. During this heating the electrode should be placed in a high vacuum or in a neutral or reducing gaseous atmosphere in order to prevent oxidation of the alkaline earth metal.

This operation requires in many cases but little time and may be finished in about one minute. The increased temperature of the electrode may be ensured by passing an electric current through the electrode. If this is inconvenient it is also possible according to the present invention to place the electrode in an atmosphere of a rare gas and connect the electrode therein as a cathode of a glow discharge.

When the alkaline earth metal is sufficiently alloyed with the surface of the electrode, the latter must still be subjected to an oxidation treatment so as to form the alkaline earth oxide. The said oxidation may be effected in any suitable manner, preferably by exposing the electrode according to the present invention to dry air. It is however also possible that a special oxidation is quite superfluous so that the electrode may be adapted for use in a discharge tube immediately after heating and alloying. In this case however certain impurities capable of oxidizing the alkaline earth metal partly or wholly are necessarily found in the material of the electrode. This may for example be the case when the electrode consists essentially of copper.

Care should preferably be taken that not all the alkaline earth metal is oxidized. Barium for example has a strong gas-purifying effect in itself so that it is preferable that a small quantity of barium should be found in the electrode, said barium volatilizing during the working of the discharge tube.

The material for an oxide cathode according to the present invention may also be produced in a continuous process, for example by passing a wire of the metal or alloy which can form an alloy with the alkaline earth metals through one or more alkaline earth metals in a fused state, for example through fused barium and subsequently heating and oxidizing the wire in the manner hereinbefore described.

The present invention relates in consequence to an electrode consisting at least at part of its surface of an alloy of one or more alkaline earth metals with one or more other metals such as copper, nickel, platinum, at least part of the alkaline earth metal being oxidized.

The electrode constructed according to the present invention is distinguished from the usual oxide cathodes by the fact that instead of a layer of the active substance being applied around the cathode, the said active substance is quite finely divided between the material of the surface of the electrode, (that is to say, within the pores of the electrode), the latter having consequently a metallic appearance.

It is therefore evident that the electrode according to the present invention is not only more easily constructed than the known electrodes but that it has considerable advantages in the working of the tube.

With filaments constructed according to this invention, the oxide layer does not drop off, and consequently a high ohmic resistance is not introduced into the circuit. The electrode shows a uniform operation and has a long life.

In certain cases it is advisable that the surface of the body used for the manufacture of the electrodes according to the invention should previously be made porous. This has the advantage that the alloying process is effected in a quicker and easier manner. According to the present invention the following method may be adopted:

The body to be treated, for example platinum, is coated in any suitable manner with a metal or an alloy capable of alloying with the metallic material of the body for example copper in the case of platinum, and then heated in such a manner that the metal or alloy first alloys with the material of the body at the surface and then volatilizes leaving small apertures or pores in the body.

It is also possible to ensure a porous layer by electrolytically precipitating for example platinum on a core of platinum or any other suitable metal.

The electrode according to the present invention may have been submitted to the process according to the present invention either at its entire surface or at part of the same and is adapted for use in many known ways.

The accompanying drawing represents by way of example an embodiment of the present invention. In the said drawing Figure 1 is a side view of a rectifier provided with an oxide cathode according to the present invention and of an arrangement of circuit connections.

Figure 2:

Figure 2 is an end-view of the oxide cathode.

As shown in the drawing the glass stems 5 and 8 are hermetically sealed to a glass bulb 1. Within the bulb an oxide cathode 3 comprising a coil of for example platinum or nickel treated by the process according to the present invention and an anode 2 of copper for example are arranged opposite each other. The anode 2 is supported by a supporting wire 4, hermetically sealed in a stem 5, the cathode 3 is supported by its leading-in wires 6 and 7 sealed in the stem 8.

The tube 1 is provided with some suitable gaseous filling for example a rare gas such as argon or a mixture of rare gases having a pressure in the neighborhood of 3 cms. of mercury.

The rectifier shown in the drawing is connected in known manner to an alternating current circuit; a double pole switch connects the circuit to the cathode 3 whereas one of the poles of the circuit is connected to the anode 2 with the interposition of a battery 12 to be charged and a regulating resistance 13. By means of the regulating resistance 14 the strength of the current serving to heat the cathode 3 can be regulated.

When putting the tube into service the switch S is closed so that an electric current flows through the oxide cathode. As soon as the discharge between the electrodes 2 and 3 has adopted a stable form, S is opened, whereupon the oxide cathode under influence of the discharge which at the cathode has the character of an arc discharge remains at the required low temperature (about 700°–1000° C.). A tube as shown in the figure can be connected to an alternating current circuit of low voltage (for example 220 volts) and with a certain tube it has been found that the current can vary between 0.1 and 1 ampere without the discharge becoming unstable. It is of course also possible to construct discharge tubes of higher power.

Referring to Figures 1 and 2 one particular process of manufacturing will still be described in detail.

A wire for example of nickel is bent in the shape shown in Figure 2 and coated with a thin layer of barium azoimide. After that the body thus obtained is placed in a glass bulb as shown in Figure 1 in which also the anode 2 is sealed. The bulb 1 is then exhausted through a tube 10 provided with a hermetically sealing tap 11, said tube being subsequently sealed off.

Once a sufficiently high vacuum is obtained, the electrode 3 is electrically heated to such a temperature that the barium azoimide decomposes into nitrogen and barium. During this treatment the anode is left without electric tension. In order to eliminate the nitrogen and other gases which might be produced, the tube may if desired be continuously exhausted during the heating of the electrode. The heating of the electrode is continued so that the barium melts and alloys with the nickel of the electrode. This heating is finished within a very short period not exceeding a few minutes.

Thereupon dry air is introduced through the tube 10 for the oxidation of at least part of the barium of the electrode 3. After the electrode has thus been exposed for example for some minutes to an oxidizing atmosphere the tube is exhausted again.

The electrode 3 is then finished. The tube 4 is filled with a suitable gas, for example argon having a pressure of say 3 cms., and a discharge is produced through the gas, the electrode 3 being connected as a cathode. A circuit arrangement as shown in Figure 1 may be used in this case. Of course the battery 12 may in this case also be replaced by a resistance of suitable value. The gases which may be liberated at first may be eliminated by exhausting the tube once more after which it is refilled with argon and sealed off from the tube 10.

The electrode constructed according to the present invention is also particularly adapted for use in rectifiers with enclosed arc discharge between fixed electrodes within an atmosphere of a rare gas, in which a glow discharge produced at the usual low voltage of the lighting system is resorted to for initiating the arc discharge, the cathode being kept at glow temperature by the discharge, and the anode remaining at a relatively low temperature.

The oxide cathodes hitherto known are less adapted for the said purpose, due to the high ohmic resistance which is introduced into the circuit by the oxide-layer when cold, whereas in the case of an electrode constructed according to the present invention the said resistance is entirely absent.

A rectifier started according to the principle above disclosed may be formed for example as follows:

A cathode comprising a platinum wire treated by the process according to the present invention is placed opposite a plate-shaped anode of iron or other suitable metal. The electrodes may be say two millimeters apart whilst the gaseous filling may consist of argon or a mixture of neon and argon having a pressure of about ten millimeters of mercury.

When such a tube, having connected in series therewith a resistance or a source of voltage of suitable value, is connected to a voltage of about 150 volts alternating current a glow discharge is initiated which at the oxide cathode is quickly transformed into an arc discharge.

The electrode manufactured according to the present invention is also applicable to discharge tubes with three electrodes for wireless telegraphy, telephony or similar purposes and the application of electrodes according to the present invention in discharge tubes of this kind having four or more electrodes has also particular advantages.

What I claim is:

1. A process of manufacturing electron-emitting electrodes which comprises applying a layer of at least one alkaline earth metal to a body which consists at least at its surface of a metallic material capable of alloying with the alkaline-earth metals, then heating said body by connecting the same as a cathode of a glow discharge in a rare gaseous non-oxidizing atmosphere so as to form an alloy of said alkaline earth metal with said metallic material, and then oxidizing at least part of said alkaline-earth metal.

2. A process of manufacturing electron-emitting electrodes which comprises rendering porous the surface of a body which consists of a metallic material capable of alloying with alkaline-earth metals, applying a layer of at least one alkaline-earth metal to the surface of said body, heating said body in a non-oxidizing atmosphere so as to form an alloy of said alkaline-earth metal with said metallic material, and then oxidizing at least part of said alkaline-earth metal.

3. A process of manufacturing electron-emitting electrodes which comprises coating a body which consists of a metallic material capable of alloying with the alkaline-earth metals, with another metallic material of lower melting point, heating said body so as to form an alloy of said materials and then removing said metallic material of lower melting point by evaporation in order to produce a porous base metal, applying a layer of at least one alkaline-earth metal to said body, heating said body in a non-oxidizing atmosphere so as to form an alloy of said alkaline-earth metal with said metallic material, and then oxidizing at least part of said alkaline-earth metal.

4. A process of manufacturing electron-emitting electrodes which comprises rendering porous the surface of the body which consists of a metallic material capable of alloying with the alkaline-earth metals, applying a layer of an alkaline-earth metal to the surface of said body, said layer of alkaline earth-metal being applied by coating said body with a compound of an alkaline earth-metal and heating said body in a non-oxidizing atmosphere so as to decompose said compound and then form an alloy of the alkaline-earth metal produced with said metallic material, and then oxidizing at least part of said alkaline-earth metal.

In testimony whereof I affix my signature, at the city of Eindhoven, this 21st day of November, 1923.

GUSTAV LUDWIG HERTZ.